United States Patent
Henninger et al.

(10) Patent No.: US 8,394,916 B2
(45) Date of Patent: *Mar. 12, 2013

(54) METHOD FOR THE PRODUCTION OF THIOPHENE OLIGOMERS

(75) Inventors: Björn Henninger, Köln (DE); Frank Rauscher, Köln (DE); Leslaw Mleczko, Dormagen (DE)

(73) Assignee: Bayer Technology Services GmbH, Leverkusen (DE)

( * ) Notice: Subject to any disclaimer, the term of this patent is extended or adjusted under 35 U.S.C. 154(b) by 264 days.

This patent is subject to a terminal disclaimer.

(21) Appl. No.: 12/668,899

(22) PCT Filed: Aug. 1, 2008

(86) PCT No.: PCT/EP2008/006335
§ 371 (c)(1),
(2), (4) Date: Jan. 13, 2010

(87) PCT Pub. No.: WO2009/021639
PCT Pub. Date: Feb. 19, 2009

(65) Prior Publication Data
US 2010/0190945 A1  Jul. 29, 2010

(30) Foreign Application Priority Data
Aug. 14, 2007  (DE) .......................... 10 2007 038 449

(51) Int. Cl.
*C08G 75/00*  (2006.01)
(52) U.S. Cl. ..................................................... 528/377
(58) Field of Classification Search .................. 528/380, 528/377
See application file for complete search history.

(56) References Cited

U.S. PATENT DOCUMENTS

| 4,521,589 A | 6/1985 | Yamamoto et al. |
| 6,229,059 B1 | 5/2001 | Motz |
| 2006/0155105 A1* | 7/2006 | Werner et al. ................. 528/377 |
| 2009/0023887 A1* | 1/2009 | Heeney et al. ................ 528/380 |

FOREIGN PATENT DOCUMENTS

| EP | 0 698 605 A1 | 2/1996 |
| EP | 1 026 138 A | 8/2000 |
| JP | 8 125 249 A | 5/1996 |
| WO | 2008/080512 A | 7/2008 |
| WO | 2008/080513 A | 7/2008 |

OTHER PUBLICATIONS

Loewe et al., "A Simple Method to Prepare Head-to-Tail Coupled, Regioregular Poly(3-alkylthiophenes) Using Grignard Metathesis", Communications, Ad. Mater. vol. 11, No. 3, p. 250-253, (1999).

Iraqi et al., "Synthesis and Characterisation of telechelic Regioregular Head-to-tail Poly(3-alkylthiophenes)", J. mater. Chem. vol. 8, No. 1, p. 25-29 (1998).

Iovu et al., "Experimental Evidence for the Quasi-"Living" Nature of the Grignard Metathesis Method for the Synthesis of Regioregular Poly(3-alkylthiophenes)", Macromolecules, vol. 38, p. 8649-8656, (2005).

Sheina et al., "Chain Growth Mechanism for Regioregular Nickel-Initiated Cross-Coupling Polymerizations", Macromolecules, vol. 37, p. 3526-3528, (2004).

\* cited by examiner

*Primary Examiner* — Shane Fang
(74) *Attorney, Agent, or Firm* — Norris McLaughlin & Marcus PA

(57) ABSTRACT

The present invention is based on a process for oligothiophene synthesis at elevated temperatures and low catalyst concentrations.

12 Claims, 1 Drawing Sheet

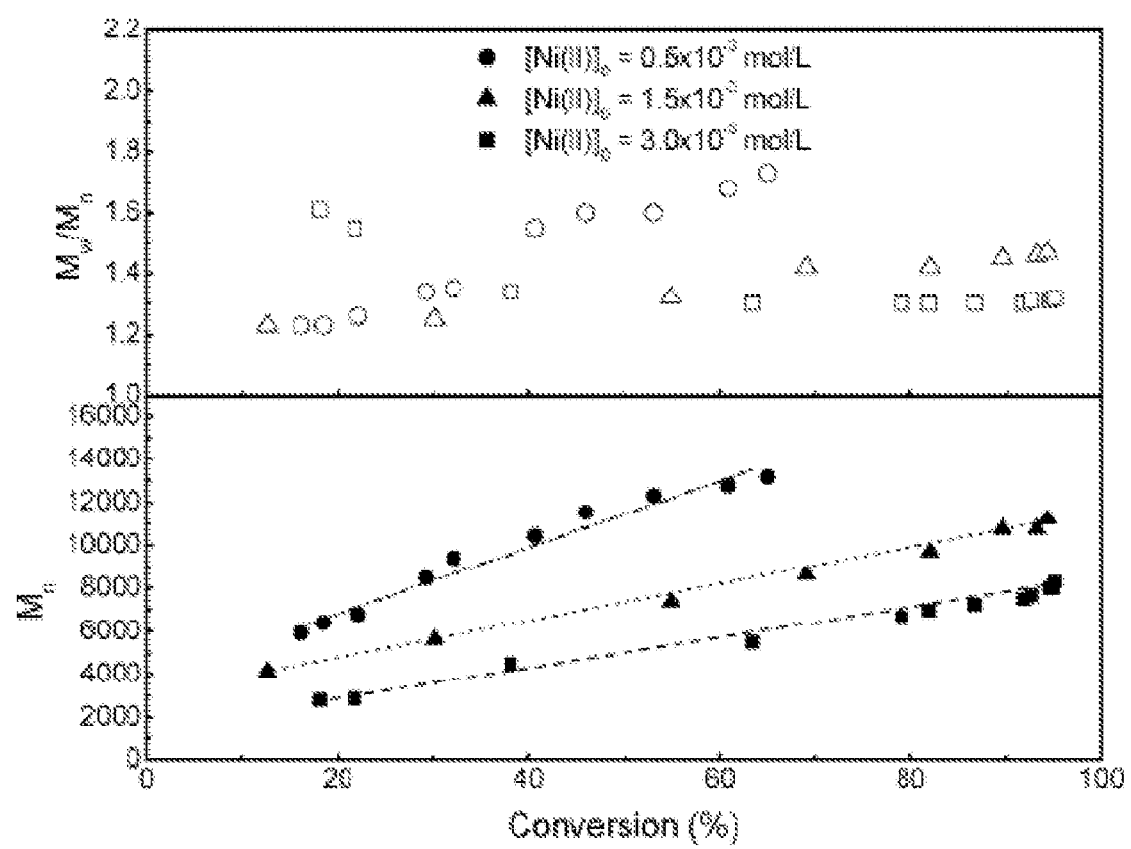

METHOD FOR THE PRODUCTION OF THIOPHENE OLIGOMERS

This is a 371 of PCT/EP2008/006335 filed 1 Aug. 2008 (international filing date).

The present invention relates to a process for preparing oligothiophenes.

BACKGROUND OF THE INVENTION

In the last 15 years, the field of molecular electronics has developed rapidly with the discovery of organic conductive and semiconductive compounds. In this time, a multitude of compounds which have semiconductive or electrooptical properties has been found. It is the general understanding that molecular electronics will not displace conventional semiconductor units based on silicon. Instead, it is assumed that molecular electronic components will open up new fields of use in which suitability for coating large areas, structural flexibility, processability at low temperatures and low costs are required. Semiconductive organic compounds are currently being developed for fields of application such as organic field-effect transistors (OFETs), organic luminescent diodes (OLEDs), sensors and photovoltaic elements. Simple structuring and integration of OFETs into integrated organic semiconductor circuits makes possible inexpensive solutions for smart cards or price tags, which have not been realizable to date with the aid of silicon technology owing to the cost and the lack of flexibility of the silicon units. It would likewise be possible to use OFETs as switching elements in large-scale flexible matrix displays.

All compounds have continuous conjugated units and are divided into conjugated polymers and conjugated oligomers according to the molecular weight and structure. Oligomers are generally distinguished from polymers in that oligomers usually have a narrow molecular weight distribution and a molecular weight up to about 10 000 g/mol (Da), whereas polymers generally have a correspondingly higher molecular weight and a broader molecular weight distribution. However, it is more sensible to distinguish by the number of repeat units, since a monomer unit can quite possibly reach a molecular weight of 300 to 500 g/mol, as, for example, in the case of (3,3''''-dihexyl)quarterthiophene. In the case of a distinction by the number of repeat units, reference is still made to oligomers in the range of 2 to about 20. However, there is a fluid transition between oligomers and polymers. Often, the difference in the processing of these compounds is also expressed with the distinction between oligomers and polymers. Oligomers are frequently evaporable and can be applied to substrates by means of vapour deposition processes. Irrespective of their molecular structure, polymers frequently refer to compounds which are no longer evaporable and are therefore generally applied by means of other processes.

An important prerequisite for the production of high-value organic semiconductor circuits is compounds of extremely high purity. In semiconductors, order phenomena play an important role. Hindrance of uniform alignment of the compounds and development of particle boundaries lead to a dramatic decline in the semiconductor properties, such that organic semiconductor circuits which have been constructed using compounds not of extremely high purity are generally unusable. Remaining impurities can, for example, inject charges into the semiconductive compound ("doping") and hence lower the on/off ratio or serve as charge traps and hence drastically lower the mobility. In addition, impurities can initiate the reaction of the semiconductive compounds with oxygen, and oxidizing impurities can oxidize the semiconductive compounds and hence shorten possible storage, processing and operating times.

The most important semiconductive poly- or oligomers include the oligothiophenes whose monomer unit is, for example, 3-hexylthiophene. In the linkage of individual or plural thiophene units to form a polymer or oligomer, it is necessary in principle to distinguish two processes—the single coupling reaction and the multiple coupling reaction in the sense of a polymerization mechanism.

In the single coupling reaction, generally two thiophene derivatives with identical or different structure are coupled with one another in one step, so as to form a molecule which then consists of in each case one unit of the two starting materials. After a removal, purification and another functionalization, this new molecule may in turn serve as a monomer and thus open up access to longer-chain molecules. This process leads generally to exactly one oligomer, the target molecule, and hence to a product with no molar mass distribution and a low level of by-products. It also offers the possibility of building up very defined block copolymers through the use of different starting materials. A disadvantage here is that molecules which consist of more than 2 monomer units can be prepared only in a very complicated manner merely owing to the purification steps and the economic outlay can be justified only for processes with very high quality demands on the product.

One process for synthesizing oligothiophenes is described in EP 1 026 138. In the actual polymerization, a regioselectively prepared Grignard compound is used as the monomer (X=halogen, R=substituent):

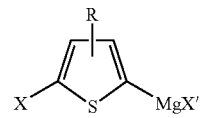

For the polymerization, the polymerization in a catalysis cycle is started by the Kumada method (cross-coupling metathesis reaction) with the aid of a nickel catalyst (preferably Ni(dppp)Cl$_2$).

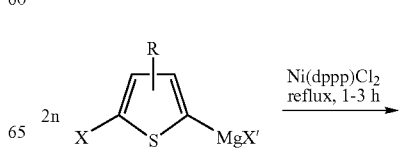

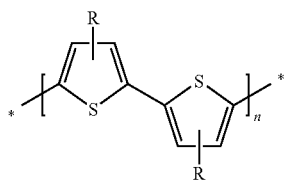

The polymers are generally obtained in the necessary purity via Soxhlet purifications.

In EP 1 026 138, the reaction is effected in such a way that first (as quantitatively as possible) the Grignard reaction is prepared and then the thiophene is polymerized with C—C bond formation by adding the nickel catalyst. Similar processes can be found, inter alia, in U.S. Pat. No. 4,521,589 and in Loewe et. al., Advanced Materials 1999, 11, No. 3, p. 250-253 and Iraqi et al., Journal of Materials Chemistry, 1998, 8 (1), p. 25-29.

The reaction mechanism of the "Kumada" reaction is, according to current opinion, that of a so-called "quasi-living" Grignard metathesis reaction. On this subject, reference is made to two documents by Richard D. McCullough et al, specifically M. C. Iovy et al. *Macromolecules* 2005, 38, 8649-8656, and E. E. Sheina, *Macromolecules* 2004, 37, 3526-3528.

According to these, the polymerization, especially of 3-substituted 2,5-dibromothiophenes, is thought to proceed by the following mechanism (scheme 1, from *Macromolecules* 2005, 38, 8649-8656):

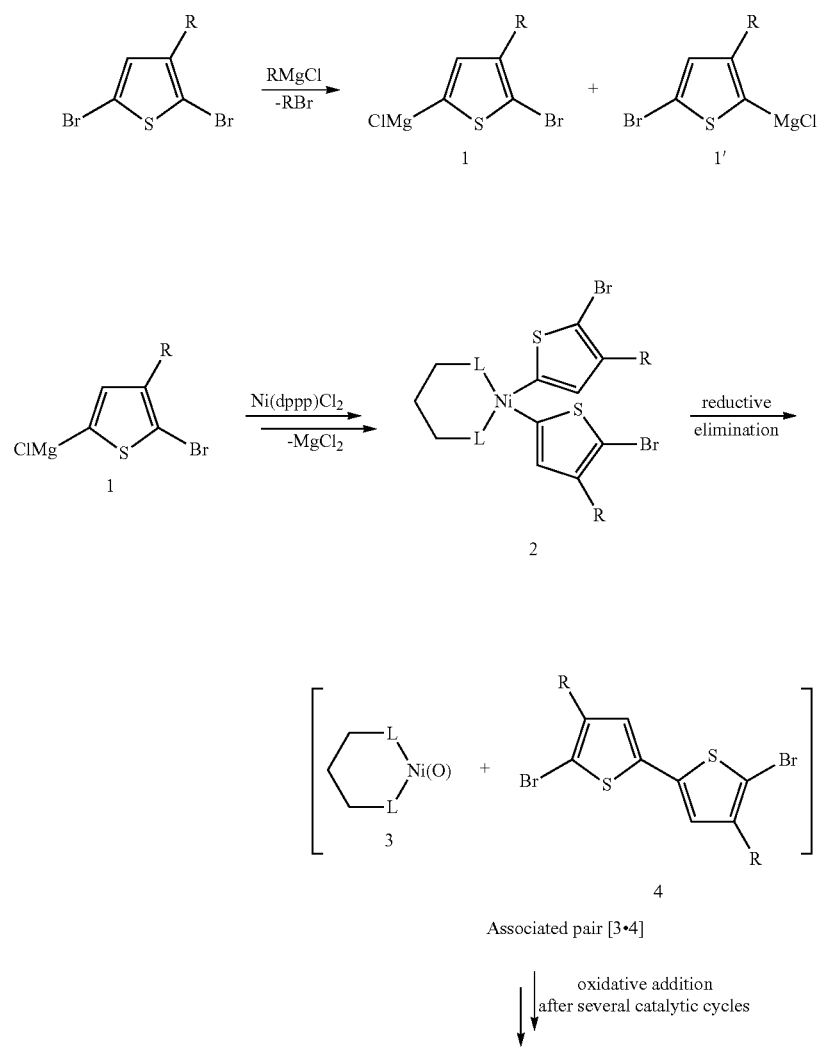

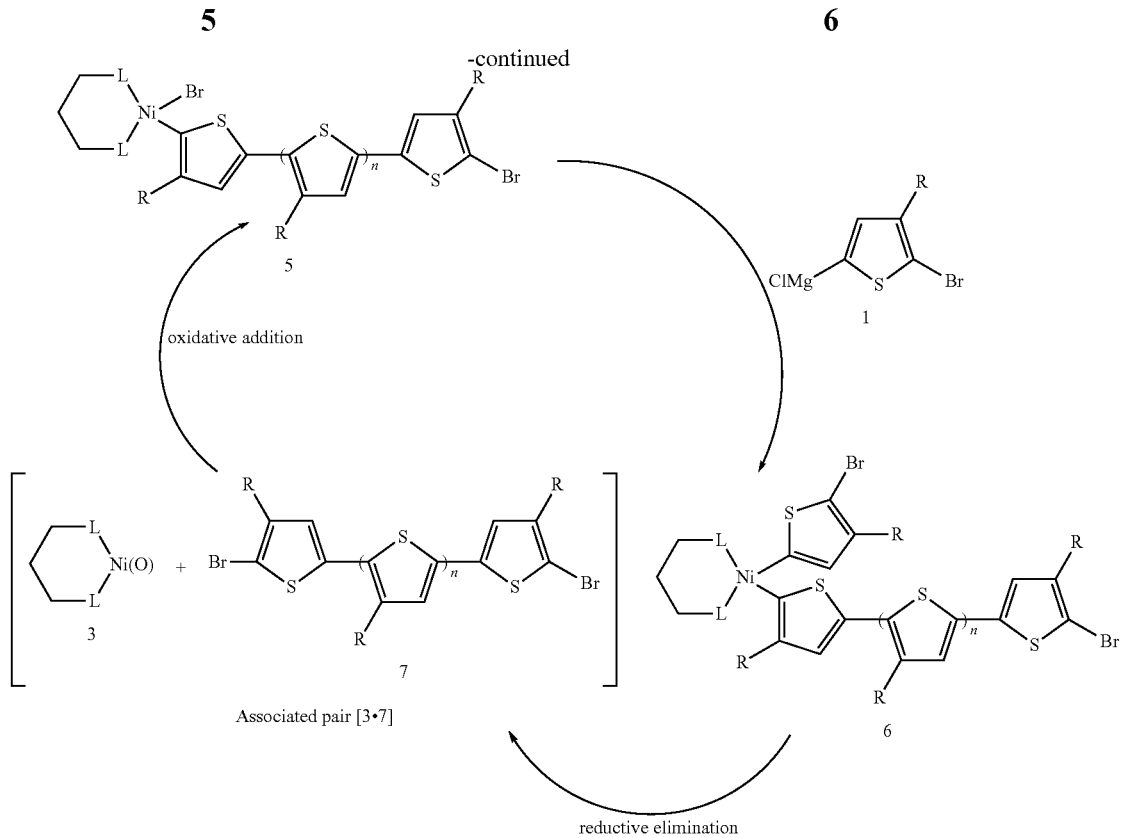

[1]:[1'] = 85:15 to 75:25

Thus, according to this mechanism, the chain length depends very substantially on the number of active catalyst sites and the amount of monomer, the molar mass being broadened by random distribution of the monomer between the growing chains. The growing chain is coordinated predominantly on a nickel site.

The connection between molar mass and catalyst concentration also becomes clear from FIG. 3 of the same document:

BRIEF DESCRIPTION OF THE DRAWING

FIG. 1 is a copy of FIG. 3 from Macromolecules 2005, 38, 8649-8656, illustrating the molecular weight distribution and average mass of oligo- and polythiophenes as a function of catalyst concentration (Ni(II)).

In this scheme, the molecular weight distribution and the average molar mass of oligo- and polythiophenes are each shown as a function of the catalyst concentration (Ni(II)). It can be seen clearly that, in the event of an increase in the catalyst concentration, the molar mass decreases, which is in agreement with the mechanism postulated.

For the controlled synthesis of oligomers, according to the mechanism outlined, a high amount of catalyst is thus absolutely necessary. However—especially in industrial scale use—a high amount of catalyst is undesired.

Proceeding from the prior art mentioned, it was therefore an object of the present invention to provide a process which at least partly overcomes the disadvantages mentioned and enables the preparation, especially the industrial scale preparation of oligothiophenes with a minimum catalyst concentration.

SUMMARY OF THE INVENTION

This object is achieved by the process of the present invention. Accordingly, a process is proposed for polymerizing at least one thiophene derivative having at least two leaving groups to oligomers, the polymerization proceeding by means of an organometallic thiophene compound and of at least one catalyst, at a catalyst concentration (based on the molar amount of the thiophene derivative used) of $\geq 01$-$\leq 0.95$ mol % and a temperature of $\geq 105°$ C.-$155°$ C.

Entirely surprisingly, it has been found that, under these conditions, oligomers with a defined chain length and molecular weight distribution are obtained, while polymers form in the case of greater amounts of catalyst.

DETAILED DESCRIPTION

In this context, "oligomers" means especially thiophene derivatives having a chain length of $n \geq 2$ to $\leq 20$ monomer units, preferably of $\geq 3$ to $\leq 12$, more preferably of $\geq 4$ to $\leq 10$ and most preferably of $\geq 5$ to $\leq 8$. Accordingly, the molecular weight of the oligothiophenes obtainable by the process is in the range of $\geq 800$ to $\leq 6000$, preferably of $\geq 900$ to $\leq 5000$, more preferably of $\geq 1000$ to $\leq 3000$, especially preferably of $\geq 1000$ to $\leq 2500$.

The exact circumstances of this surprising finding—especially at a mechanistic level—are not known or have not been studied exactly; however, it appears to be the case that the mechanism assumed to date in the technical field is not applicable within this narrow part of the range.

The process preferably proceeds at a catalyst concentration (based on the molar amount of the thiophene derivative used)

of ≧0.05-≦0.85 mol %, preferably ≧0.15-≦0.75 mol %, more preferably of ≧0.25-≦0.55 mol % and most preferably of ≧0.35-≦0.45 mol %.

The process preferably proceeds at a temperature of ≧110° C.-≦150° C., more preferably ≧115° C.-≦145° C. and most preferably ≧120° C.-≦140° C.

In a preferred embodiment of the invention, the reaction is effected at elevated pressures, preferably at ≧1-≦30 bar, especially at ≧2-≦15 bar and more preferably in the range of ≧4-≦10 bar.

In the context of the present invention, the term "thiophene derivative" is understood to mean both mono-, di- or polysubstituted thiophene and unsubstituted thiophene. Preference is given to thiophene derivatives which are alkyl-substituted, particular preference to 3-alkyl-substituted thiophene derivatives.

In the context of the present invention, the term "leaving group" is understood especially to mean any group which is capable of reacting by means of a metal or an organometallic compound to form an organometallic thiophene compound. Particularly preferred leaving groups are halogens, sulphates, sulphonates and diazo groups.

In a preferred embodiment of the invention, the at least one thiophene derivative contains at least two different leaving groups. This can be useful for the achievement of a better regioselectivity of the polymer in many applications of the present invention.

In an alternative preferred embodiment of the invention, the leaving groups of the at least one thiophene derivative are identical.

In the context of the present invention, the term "organometallic thiophene compound" is understood to mean especially a compound in which at least one metal-carbon bond to one of the carbon atoms on the thiophene heterocycle is present.

The term "organometallic compound" is understood to mean especially an organometallic alkyl-metal compound.

Preferred metals within the at least one organometallic thiophene compound are tin, magnesium, zinc and boron. It is pointed out that boron is likewise considered as a metal within the present invention. In the case that the process according to the invention proceeds with the involvement of boron, the leaving group is preferably selected from the group comprising MgBr, MgI, MgCl, Li or mixtures thereof.

The organometallic compounds which are used in the process according to the invention are preferably organometallic tin compounds, for example tributyltin chloride, or zinc compounds, for example activated zinc (Zn*), or borane compounds, for example $B(OMe)_3$ or $B(OH)_3$, or magnesium compounds, more preferably organometallic magnesium compounds, more preferably Grignard compounds of the formula R—Mg—X, where R is alkyl, most preferably C2-alkyl, and X is halogen, more preferably Cl, Br or I, and especially Br.

The term "catalyst" is understood to mean especially a catalytically active metal compound.

In a preferred embodiment of the invention, the at least one catalyst comprises nickel and/or palladium. This has been found to be favourable in many application examples of the present invention.

More preferably, the at least one catalyst comprises at least one compound selected from the group of nickel and palladium catalysts with ligands selected from the group of tri-tert-butylphosphine, triadamantylphosphine, 1,3-bis(2,4,6-trimethylphenyl)imidazolidinium chloride, 1,3-bis(2,6-diisopropylphenyl)imidazolidinium chloride or 1,3-diadamantylimidazolidinium chloride or mixtures thereof; bis(triphenylphosphino)palladium dichloride ($Pd(PPh_3)Cl_2$), palladium(II) acetate ($Pd(OAc)_2$), tetrakis(triphenylphosphine)palladium ($Pd(PPh_3)_4$), tetrakis(triphenylphosphine) nickel ($Ni(PPh_3)_4$), nickel(II) acetylacetonate $Ni(acac)_2$, dichloro(2,2'-bipyridine)nickel, dibromobis(triphenylphosphine)nickel ($Ni(PPh_3)_2Br_2$), bis(diphenylphosphino)propanenickel dichloride ($Ni(dppp)Cl_2$) or bis(diphenylphosphino)ethanenickel dichloride $Ni(dppe)Cl_2$ or mixtures thereof.

General group definitions: Within the description and the claims, general groups, for example: alkyl, alkoxy, aryl, etc., are claimed and described. Unless stated otherwise, the following groups within the groups described in general are used with preference in the context of the present invention:

alkyl: linear and branched C1-C8-alkyls,
long-chain alkyls: linear and branched C5-C20 alkyls
alkenyl: C2-C8-alkenyl,
cycloalkyl: C3-C8-cycloalkyl,
alkoxy: C1-C6-alkoxy,
long-chain alkoxy: linear and branched C5-C20 alkoxy
alkylene: selected from the group comprising:
methylene; 1,1-ethylene; 1,2-ethylene; 1,1-propylidene; 1,2-propylene; 1,3-propylene; 2,2-propylidene; butan-2-ol-1,4-diyl; propan-2-ol-1,3-diyl; 1,4-butylene; cyclohexane-1,1-diyl; cyclohexane-1,2-diyl; cyclohexane-1,3-diyl; cyclohexane-1,4-diyl; cyclopentane-1,1-diyl; cyclopentane-1,2-diyl; and cyclopentane-1,3-diyl,
aryl: selected from aromatics having a molecular weight below 300 Da,
arylene: selected from the group comprising: 1,2-phenylene; 1,3-phenylene; 1,4-phenylene; 1,2-naphthalenylene; 1,3-naphthalenylene; 1,4-naphthalenylene; 2,3-naphthalenylene; 1-hydroxy-2,3-phenylene; 1-hydroxy-2,4-phenylene; 1-hydroxy-2,5-phenylene; and 1-hydroxy-2,6-phenylene, heteroaryl: selected from the group comprising: pyridinyl; pyrimidinyl; pyrazinyl; triazolyl; pyridazinyl; 1,3,5-triazinyl; quinolinyl; isoquinolinyl; quinoxalinyl; imidazolyl; pyrazolyl; benzimidazolyl; thiazolyl; oxazolidinyl; pyrrolyl; thiophenyl; carbazolyl; indolyl; and isoindolyl, where the heteroaryl may be bonded to the compound via any atom in the ring of the selected heteroaryl,
heteroarylenes: selected from the group comprising: pyridinediyl; quinolinediyl; pyrazodiyl; pyrazolediyl; triazolediyl; pyrazinediyl, thiophenediyl; and imidazolediyl, where the heteroarylene functions as a bridge in the compound via any atom in the ring of the selected heteroaryl; especially preferred are: pyridine-2,3-diyl; pyridine-2,4-diyl; pyridine-2,5-diyl; pyridine-2,6-diyl; pyridine-3,4-diyl; pyridine-3,5-diyl; quinoline-2,3-diyl; quinoline-2,4-diyl; quinoline-2,8-diyl; isoquinoline-1,3-diyl; isoquinoline-1,4-diyl; pyrazole-1,3-diyl; pyrazole-3,5-diyl; triazole-3,5-diyl; triazole-1,3-diyl; pyrazine-2,5-diyl; and imidazole-2,4-diyl, thiophene-2,5-diyl, thiophene-3,5-diyl; a C1-C6-heterocycloalkyl, selected from the group comprising: piperidinyl; piperidine; 1,4-piperazine, tetrahydrothiophene; tetrahydrofuran; 1,4,7-triazacyclononane; 1,4,8,11-tetraazacyclotetradecane; 1,4,7,10,13-pentaazacyclopentadecane; 1,4-diaza-7-thiacyclononane; 1,4-diaza-7-oxa-cyclononane; 1,4,7,10-tetraazacyclododecane; 1,4-dioxane; 1,4,7-trithiacyclononane; pyrrolidine; and tetrahydropyran, where the heteroaryl may be bonded to the C1-C6-alkyl via any atom in the ring of the selected heteroaryl,
heterocycloalkylenes: selected from the group comprising: piperidin-1,2-ylene; piperidin-2,6-ylene; piperidin-4,4-ylidene; 1,4-piperazin-1,4-ylene; 1,4-piperazin-2,3-ylene; 1,4-piperazin-2,5-ylene; 1,4-piperazin-2,6-ylene; 1,4-piperazin-1,2-ylene; 1,4-piperazin-1,3-ylene; 1,4-piperazin-1,4- ylene; tetrahydrothiophen-2,5-ylene; tetrahydrothiophen-3,4-ylene; tetrahydrothiophen-2,3-ylene; tetrahydrofuran-2,5-ylene; tetrahydrofuran-3,4-ylene; tetrahydrofuran-2,3-ylene; pyrrolidin-2,5-ylene; pyrrolidin-3,4-ylene; pyrrolidin-2,3-ylene; pyrrolidin-1,2-ylene; pyrrolidin-1,3-ylene; pyrrolidin-2,2-ylidene; 1,4,7-triazacyclonon-1,4-ylene; 1,4,7-triazacyclonon-2,3-ylene; 1,4,7-triazacyclonon-2,9-ylene; 1,4,7-triazacyclonon-3,8-ylene; 1,4,7-triazacyclonon-2,2-ylidene; 1,4,8,11-tetraazacyclotetradec-1,4-ylene; 1,4,8,11-tetraazacyclotetradec-1,8-ylene; 1,4,8,11-tetraazacyclotetradec-2,3-ylene; 1,4,8,11-tetraazacyclotetradec-2,5-ylene; 1,4,8,11-tetraazacyclotetradec-1,2-ylene; 1,4,8,11-tetraazacyclotetradec-2,2-ylidene; 1,4,7,10-tetraazacyclododec-1,4-ylene; 1,4,7,10-tetraazacyclododec-1,7-ylene; 1,4,7,10-tetraazacyclododec-1,2-ylene; 1,4,7,10-tetraazacyclododec-2,3-ylene; 1,4,7,10-tetraazacyclododec-2,2-ylidene; 1,4,7,10,13-pentaazacyclopentadec-1,4-ylene; 1,4,7,10,13-pentaazacyclopentadec-1,7-ylene; 1,4,7,10,13-pentaazacyclopentadec-2,3-ylene; 1,4,7,10,13-pentaazacyclopentadec-1,2-ylene; 1,4,7,10,13-pentaazacyclopentadec-2,2-ylidene; 1,4-diaza-7-thia-cyclonon-1,4-ylene; 1,4-diaza-7-thia-cyclonon-1,2-ylene; 1,4-diaza-7-thia-cyclonon-2,3-ylene; 1,4-diaza-7-thia-cyclonon-6,8-ylene; 1,4-diaza-7-thia-cyclonon-2,2-ylidene; 1,4-diaza-7-oxacyclonon-1,4-ylene; 1,4-diaza-7-oxa-cyclonon-1,2-ylene; 1,4-diaza-7-oxa-cyclonon-2,3-ylene; 1,4-diaza-7-oxa-cyclonon-6,8-ylene; 1,4-diaza-7-oxa-cyclonon-2,2-ylidene; 1,4-dioxan-2,3-ylene; 1,4-dioxan-2,6-ylene; 1,4-dioxan-2,2-ylidene; tetrahydropyran-2,3-ylene; tetrahydropyran-2,6-ylene; tetrahydropyran-2,5-ylene; tetrahydropyran-2,2-ylidene; 1,4,7-trithiacyclonon-2,3-ylene; 1,4,7-trithiacyclonon-2,9-ylene; and 1,4,7-trithiacyclonon-2,2-ylidene, heterocycloalkyl: selected from the group comprising: pyrrolinyl; pyrrolidinyl; morpholinyl; piperidinyl; piperazinyl; hexamethylene imine; 1,4-piperazinyl; tetrahydrothiophenyl; tetrahydrofuranyl; 1,4,7-triazacyclononanyl; 1,4,8,11-tetraazacyclotetradecanyl; 1,4,7,10,13-pentaazacyclopentadecanyl; 1,4-diaza-7-thiacyclononanyl; 1,4-diaza-7-oxacyclononanyl; 1,4,7,10-tetraazacyclododecanyl; 1,4-dioxanyl; 1,4,7-trithiacyclononanyl; tetrahydropyranyl; and oxazolidinyl, where the heterocycloalkyl may be bonded to the compound via any atom in the ring of the selected heterocycloalkyl, halogen: selected from the group comprising: F; Cl; Br and I, haloalkyl: selected from the group comprising mono-, di-, tri-, poly- and perhalogenated linear and branched C1-C8-alkyl, pseudohalogen: selected from the group comprising —CN, —SCN, —OCN, N3, —CNO, —SeCN.

Unless stated otherwise, the following groups are more preferred groups within the general group definitions:

alkyl: linear and branched C1-C6-alkyl, long-chain alkyls: linear and branched C5-C10 alkyl, preferably C6-C8 alkyls, alkenyl: C3-C6-alkenyl, cycloalkyl: C6-C8-cycloalkyl, alkoxy: C1-C4-alkoxy, long-chain alkoxy: linear and branched C5-C10 alkoxy, preferably linear C6-C8 alkoxy, alkylene: selected from the group comprising: methylene; 1,2-ethylene; 1,3-propylene; butan-2-ol-1,4-diyl; 1,4-butylene; cyclohexane-1,1-diyl; cyclohexane-1,2-diyl; cyclohexane-1,4-diyl; cyclopentane-1,1-diyl; and cyclopentane-1,2-diyl, aryl: selected from the group comprising: phenyl; biphenyl; naphthalenyl; anthracenyl; and phenanthrenyl, arylene: selected from the group comprising: 1,2-phenylene; 1,3-phenylene; 1,4-phenylene; 1,2-naphthalenylene; 1,4-naphthalenylene; 2,3-naphthalenylene and 1-hydroxy-2,6-phenylene, heteroarylene: thiophene, pyrrole, pyridine, pyridazine, pyrimidine, indole, thienothiophene, halogen: selected from the group comprising: Br and Cl, more preferably Br.

In a preferred embodiment of the invention, the at least one thiophene derivative comprises at least one compound of the general formula:

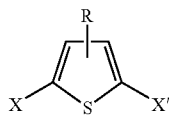

where R is selected from the group comprising hydrogen, hydroxyl, halogen, pseudohalogen, formyl, carboxyl and/or carbonyl derivatives, alkyl, long-chain alkyl, alkoxy, long-chain alkoxy, cycloalkyl, haloalkyl, aryl, arylene, haloaryl, heteroaryl, heteroarylene, heterocycloalkylene, heterocycloalkyl, haloheteroaryl, alkenyl, haloalkenyl, alkynyl, haloalkynyl, keto, ketoaryl, haloketoaryl, ketoheteroaryl, ketoalkyl, haloketoalkyl, ketoalkenyl, haloketoalkenyl, phosphoalkyl, phosphonates, phosphates, phosphine, phosphine oxide, phosphoryl, phosphoaryl, sulphonyl, sulphoalkyl, sulphoarenyl, sulphonate, sulphate, sulphone, amine, polyether, silylalkyl, silylalkyloxy, where, in the case of suitable radicals, one or more nonadjacent $CH_2$ groups may independently be replaced by —O—, —S—, —NH—, —NR—, —SiRR—, —CO—, —COO—, —OCO—, —OCO—O—, —$SO_2$—, —S—CO—, —CO—S—, —$CY^1$=$CY^2$— or —C≡C—, and in such a way that oxygen and/or sulphur atoms are not bonded directly to one another (terminal $CH_3$ groups are interpreted as $CH_2$ groups in the sense of $CH_2$—H)

and where X and X' are each independently a leaving group, preferably halogen, more preferably Cl, Br or I and especially preferably Br.

In a preferred embodiment of the present invention, the first and/or the second solution comprises a solvent selected from the group of aliphatic hydrocarbons, for example alkanes, especially pentane, hexane, cyclohexane or heptane, unsubstituted or substituted aromatic hydrocarbons, for example benzene, toluene and xylenes, and compounds containing ether groups, for example diethyl ether, tert-butyl methyl ether, dibutyl ether, amyl ethers, dioxane and tetrahydrofuran (THF), and solvent mixtures of the aforementioned groups.

In the process according to the invention, preference is given to using solvents which contain ether groups. Very particular preference is given to tetrahydrofuran. However, it is also possible and preferred for numerous working examples of the present invention to use mixtures of two or more of these solvents as the solvent. For example, it is possible to use mixtures of the tetrahydrofuran solvent used with preference and alkanes, for example hexane (for example present in commercially available solutions of starting materials such as organometallic compounds). What is important in the context of the invention is that the solvent, the solvents or the mixtures thereof are selected such that the thiophene derivatives used or the polymerization-active monomers are present in dissolved form in the first solution. Also suitable for the workup are halogenated aliphatic hydrocarbons such as methylene chloride and chloroform.

In a preferred embodiment of the process according to the invention, the reaction is ended ("quenched") by adding a hydrolyzing solvent to the polymerization solution, preferably an alkyl alcohol, more preferably ethanol or methanol, most preferably methanol.

The workup is effected preferably by filtering off the precipitated product, washing it with the precipitant and then taking it up in a solvent.

Alternatively and likewise preferably, a purification can be effected in a Soxhlet, in which case preference is given to using nonpolar solvents, for example hexane, as the extractant.

The oligomers prepared by the process are additionally notable, in many embodiments, for the presence of one or two leaving groups at the chain end, which can serve later as substitution sites for functionalizations or end-capping reactions.

For a preferred embodiment of the present invention, after performing the polymerization but before the workup (especially the quenching), reaction is effected with a thiophene derivative having only one leaving group. This can achieve a so-called end-capping. The thiophene derivative having only one leaving group preferably possesses a radical which can be functionalized further, preferably in the 5 position, which is preferably selected from the group of phosphoalkyl, phosphonate, phosphate, phosphine, phosphine oxide, phosphoryl, phosphoaryl, sulphonyl, sulphoalkyl, sulphoarenyl, sulphonate, sulphate, sulphone or mixtures thereof. This has been found to be advantageous for many applications of the present invention.

The process according to the invention is notable, in particular, in many applications, for the possibility of controlled establishment of a desired mean chain length, and also for the preparation of products with a narrow molecular weight distribution.

The invention likewise provides the oligothiophenes obtained by the process according to the invention.

Preference is given to obtaining oligothiophenes with a narrow molecular weight distribution with a polydispersity index PDI of $\geq 1$ to $\leq 3$, preferably PDI$\leq 2$, more preferably PDI$\geq 1.1$ to $\leq 1.7$.

The aforementioned components to be used in accordance with the invention, and also those claimed and those described in the working examples, are not subject, in terms of their size, shape configuration, material selection and technical design, to any particular exceptional conditions, such that the selection criterion known in the field of use can be applied without restriction.

Further details, features and advantages of the subject-matter of the invention are evident from the subclaims and from the description of the following working example which follows.

Example 1

Example 1 should be understood purely illustratively and does not constitute any restriction of the present invention, which is defined purely by the claims.

In the example, two metered streams were reacted with one another in a micromixer.

Metered Stream 1

| 2,5-Dibromo-3-hexylthiophene | 5% by weight |
| Ni(dppp)Cl$_2$: | 0.04% by weight, corresponds to 0.5 mol-% |
| THF | 94.96% by weight |

Metered Stream 2:
1 M Ethylmagnesium bromide solution in THF
The gross reaction equation thus corresponds to:

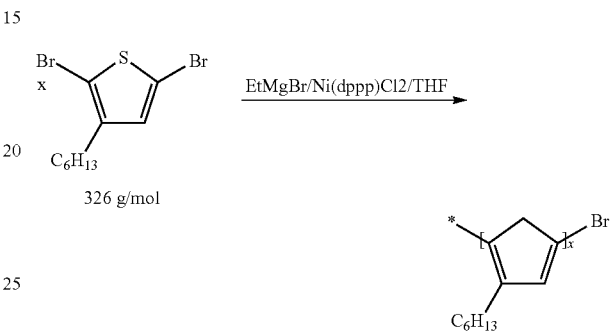

Experimental Setup:

The two reactant streams are metered in separately from one another via piston syringe pumps. For intensive mixing, the two reactant streams are mixed by the use of a pt-mixer (from Ehrfeld) and then conveyed through a reaction capillary ($\frac{1}{16}$") and subsequently through a further delay reactor (sandwich reactor (from Ehrfeld)). The temperature in the capillary is controlled to room temperature, but 140° C. in the delay reactor. The overall pressure is 6 bar in the system and is maintained by means of a pressure retaining valve at the reactor outlet. The residence time is 25 min in total, and divides into about 7 min in the reaction capillary and about 18 min in the delay reactor.

Workup:

The reaction solution is added to methanol and the precipitated solid is filtered off. The solid is subsequently extracted with hexane. The desired oligomer is obtained from the hexane phase concentrated by rotary evaporation.

Mw=1600 g/mol
Mn=950 g/mol
Yield 70%

Comparative Example 1

For comparison, a polymerization was carried out with a higher catalyst concentration not in accordance with the invention.

The setup and the reactants corresponded to the inventive example, except that a catalyst concentration of 1 mol % was selected.

A polymer was obtained with the following data:
Mw=13 200 g/mol
Mn=5300 g/mol
Yield 71%

In comparison to the inventive example, it is noticeable that, in spite of the higher catalyst concentration, longer rather than shorter chains are obtained.

The invention claimed is:

1. Process for polymerizing at least one thiophene derivative having at least two leaving groups to oligomers having molecular weights of from 1,000 to 3,000, the polymerization proceeding by means of an organometallic thiophene compound and of at least one catalyst at a catalyst concentration, based on the molar amount of the thiophene derivative used, of $\geq 0.05\text{-}\leq 0.85$ mol %, a pressure of 4 to 15 bars and a temperature of $\geq 120°$ C.$\text{-}\leq 140°$ C.

2. Process according claim 1, wherein said at least one thiophene derivative contains at least one leaving group selected from the group consisting of halogens, sulphates, sulphonates and diazo groups.

3. Process according to claim 1, wherein the leaving groups of the at least one thiophene derivative are identical.

4. Process according to claim 1, wherein the organometallic thiophene compound contains at least one metal selected from the group consisting of zinc, magnesium, tin and boron.

5. Process according to claim 1, wherein said at least one catalyst comprises nickel, palladium or both nickel and palladium.

6. Process according to claim 1, wherein said at least one thiophene derivative comprises at least one compound of the formula:

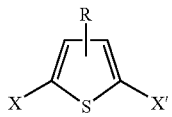

where R is selected from the group consisting of hydrogen, hydroxyl, halogen, pseudohalogen, formyl, carboxyl derivatives, carbonyl derivatives, alkyl, long-chain alkyl, alkoxy, long-chain alkoxy, cycloalkyl, haloalkyl, aryl, arylene, haloaryl, heteroaryl, heteroarylene, heterocycloalkylene, heterocycloalkyl, haloheteroaryl, alkenyl, haloalkenyl, alkynyl, haloalkynyl, keto, ketoaryl, haloketoaryl, ketoheteroaryl, ketoalkyl, haloketoalkyl, ketoalkenyl, haloketoalkenyl, phosphoalkyl, phosphonates, phosphates, phosphine, phosphine oxide, phosphoryl, phosphoaryl, sulphonyl, sulphoalkyl, sulphoarenyl, sulphonate, sulphate, sulphone, amine, polyether, silylalkyl and silylalkyloxy, where, in the case of radicals having one or more nonadjacent $CH_2$ groups, one or more of said nonadjacent $CH_2$ groups are optionally independently replaced by —O—, —S—, —NH—, —NR—, —SiRR—, —CO—, —OOO—, —OOO—, —OOO—O—, —$SO_2$—, —S—OO—, —CO—S—, —$CY^1$=$CY^2$— or —C≡C—, and in such a way that oxygen and/or sulphur atoms are not bonded directly to one another, with terminal $CH_3$ groups being interpreted as $CH_2$ groups in the sense of $CH_2$—H and where X and X' are each independently a leaving group.

7. Process according to claim 5, wherein said at least one catalyst comprises at least one compound selected from the group consisting of nickel and palladium catalysts with ligands selected from the group consisting of tri-tert-butylphosphine, triadamantylphosphine, 1,3-bis(2,4,6-trimethylphenyl)imidazolidinium chloride, 1,3-bis(2,6-diisopropylphenyl)-imidazolidinium chloride or 1,3-diadamantylimidazolidinium chloride or mixtures thereof; bis(triphenylphosphino)palladium dichloride ($Pd(PPh_3)Cl_2$), palladium(II) acetate ($Pd(OAc)_2$), tetrakis(triphenylphosphine)palladium ($Pd(PPh_3)_4$), tetrakis(triphenylphosphine) nickel ($Ni(PPh_3)_4$), nickel(II) acetylacetonate $Ni(acac)_2$, dichloro(2,2'-bipyridine)nickel, dibromobis(triphenylphosphine)nickel ($Ni(PPh_3)_2Br_2$), bis(diphenylphosphino)propanenickel dichloride ($Ni(dppp)Cl_2$) or bis(diphenylphosphino)ethanenickel dichloride $Ni(dppe)Cl_2$ and mixtures thereof.

8. Process according to claim 1, wherein said catalyst concentration is $\geq 0.15\text{-}\leq 0.75$ mol %.

9. Process according to claim 8, wherein said catalyst concentration is $\geq 0.25\text{-}\leq 0.55$ mol %.

10. Process according to claim 9, wherein said catalyst concentration is, $\geq 0.35\text{-}\leq 0.45$ mol %.

11. Process according to claim 1, wherein said pressure is in the range of $\geq 4\text{-}\leq 10$ bar.

12. Process according to claim 6, wherein said leaving groups are selected from the group consisting of Cl, Br and I.

* * * * *